M. ENGELSMAN.
RING AND FINGER GAGE.
APPLICATION FILED APR. 3, 1912.
1,213,607.
Patented Jan. 23, 1917.
2 SHEETS—SHEET 1.
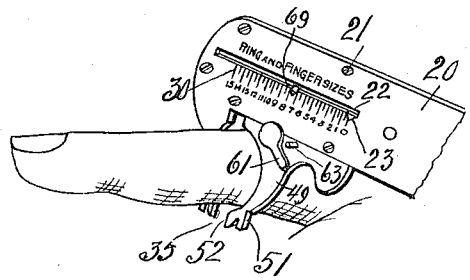
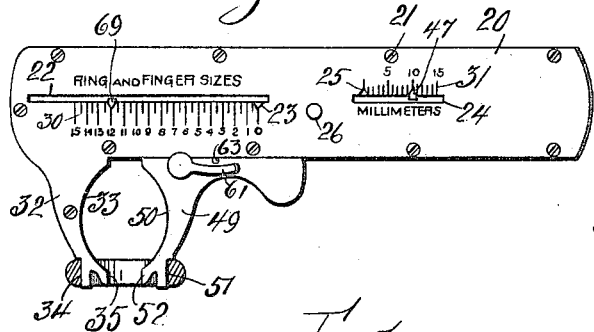
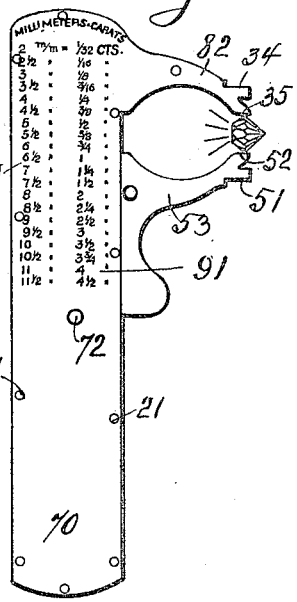
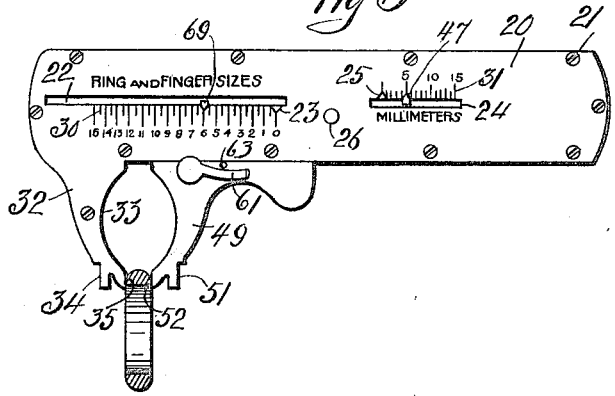
Witnesses:
Martin Zimansky
Franklin Grady
Inventor
Monroe Engelsman
By his Attorney
A. N. de Bonneville

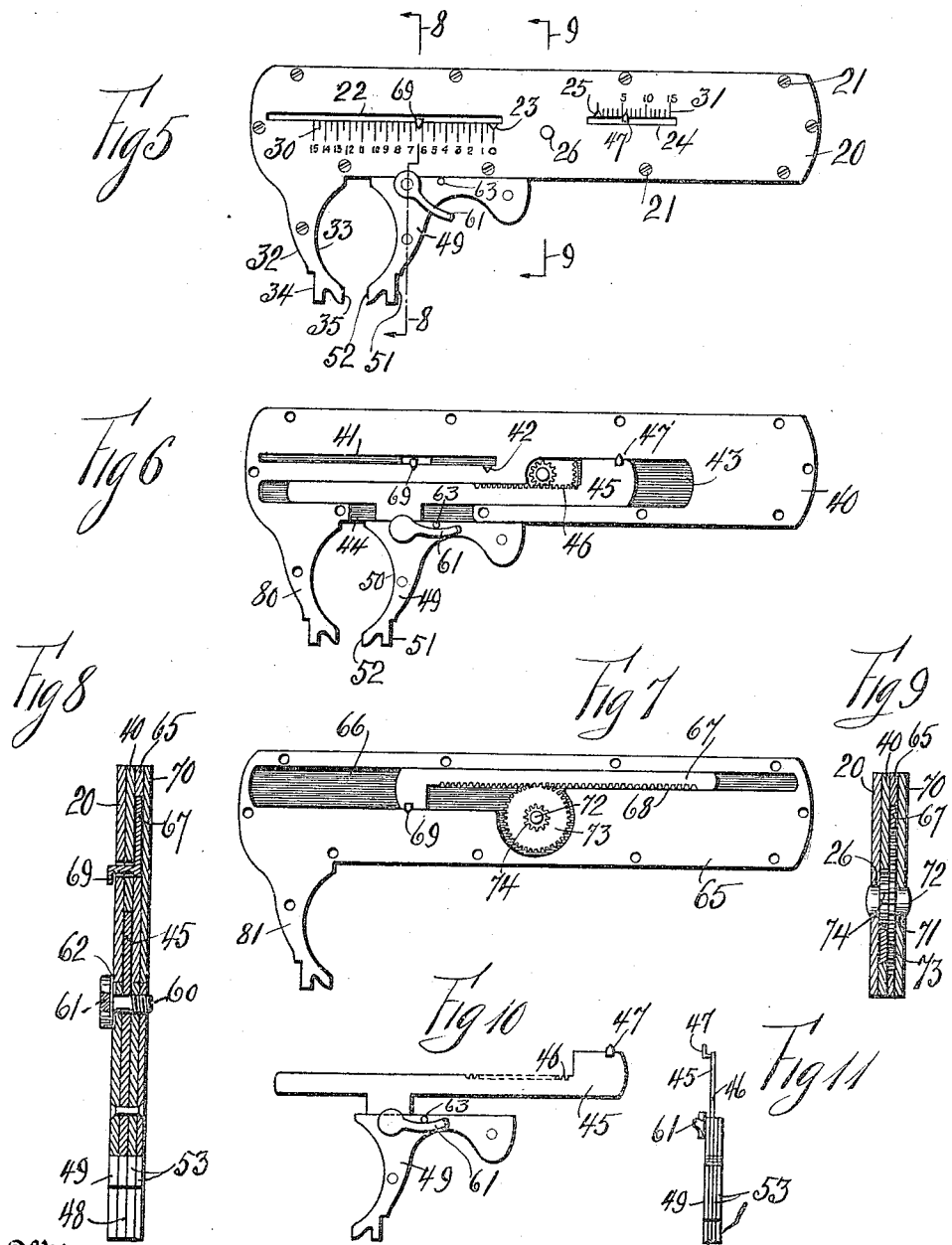

UNITED STATES PATENT OFFICE.

MONROE ENGELSMAN, OF NEW YORK, N. Y.

RING AND FINGER GAGE.

1,213,607.  Specification of Letters Patent.  Patented Jan. 23, 1917.

Application filed April 3, 1912. Serial No. 688,244.

*To all whom it may concern:*

Be it known that I, MONROE ENGELSMAN, a citizen of the United States, and a resident of the borough of Manhattan, in the county of New York and State of New York, have invented certain new and useful Improvements in Ring and Finger Gages, of which the following is a specification.

This invention relates to a ring and finger gage and with which also other objects can be measured. It is an improvement of my patent application filed July 30th, 1908, Serial Number 446,173. It is characterized by a pair of measuring jaws one stationary and the other movable with appurtenances co-acting with the latter, by virtue of which ring and finger sizes are measured on a scale to correspond to the relative location of one portion of the movable jaw to the stationary jaw. Various objects can also be measured by the relative position of another portion of the movable jaw with reference to the stationary jaw, and which is indicated on a second scale. The jaws of the gage are characterized with inner edges to fit a finger and outer edges to gage a ring.

Referring to the accompanying drawings Figure 1 represents a perspective view of a portion of the invention in place on a finger, Fig. 2 shows a front elevation of the gage gaging a ring, Fig. 3 is a view similar to Fig. 2 with the gage measuring the width of a ring or any other article, Fig. 4 represents a rear view of the gage measuring a diamond or any other precious stone, Fig. 5 shows a front view of the gage with its movable jaw in its unlocked position, Fig. 6 is a view similar to Fig. 5 with the top plate of the gage removed, Fig. 7 is a view similar to Fig. 6 with the top plate of the latter removed. Fig. 8 shows an enlarged cross-section of Fig. 5 on the line 8, 8, Fig. 9 represents an enlarged cross-section of Fig. 5 on the line 9, 9, Fig. 10 shows the movable jaw with its appurtenances and Fig. 11 is a right hand side view of Fig. 10.

The gage is shown to comprise four plates, the top plate of which is designated by the numeral 20, and which plates are connected by the screws 21. A longitudinal slot 22 with the notch 23, a shorter longitudinal slot 24 with a notch 25, and a pivot hole 26 are formed in said plate 20. A scale 30 is formed on the plate 20 adjacent to the slot 22 to read finger and ring sizes, and a scale 31 is indicated on the plate 20 to read the widths of objects measured by the inner faces of the jaws. This latter scale is preferably of the millimeter type. From the plate 20 extends what I term the stationary jaw 32, with the curved inner finger gaging edge 33, the outer ring gaging edge 34 and the ordinary inner measuring edge 35. The edges 33 and 34 are in line, that is to say, a tangent to the edge 33 perpendicular to the longitudinal axis of the gage, coincides with the edge 34.

A second plate 40 is located below the top plate 20. A slot 41 with the notch 42 is formed in the plate 40 to register respectively with the slot 22 and notch 23, and a guide slot 43 with the depending portion 44 are also formed in the plate 40. A pointer bar 45 is located in the slot 43. The bar 45 has formed therewith the rack 46, the pointer 47 that extends through the slot 24, and the jaw 48 with its outer plate 49 similar to the jaw 32. That is to say the latter jaw has the inner finger gaging edge 50, the outer ring gaging edge 51 and the ordinary inner measuring edge 52. The edges 50 and 51 are in line as described for the edges 33 and 34. The edges 33 and 50 measure the finger and the edges 34 and 51 measure the ring for said finger, which makes the first pair of edges correlative to the second pair. The jaw 48 has riveted thereto a plurality of plates 53 to its lower surface, so as to make it of a thickness equal to that of the jaw 32. A screw 60 having the handle 61 is in threaded engagement with the jaw 48, and a washer 62 on said screw bears between its head and the outer face of the top plate 20. A stop pin 63 extends from the outer face of the jaw 48 in the path of the handle 61.

A third plate 65 is located under the second plate 40 and has formed therein a slot 66. A reciprocating pointer bar 67 is located in the slot 66, and has formed therewith the rack 68 and pointer 69. The latter extends through the slots 22 and 41.

A fourth or rear plate 70 is located below the plate 65. It has formed therein the pivot hole 71 which supports a pivot 72, the other end of which latter extends through the opening 26 in the plate 20.

A spur gear 73 fastened to the pivot 72 and located between the plates 40 and 70, meshes with the rack 68 of the pointer bar 67. A pinion 74 fastened to the pivot 72 above the gear 73 meshes with the rack 46 of the pointer bar 45. It will be noted that the plates 40, 65 and 70 have jaws 80, 81 and 82 similar to the jaw 32 of the plate 20, so as to preserve a uniform thickness for the gage. On the rear of the plate 70 there are indicated a millimeter scale 90 and an equivalent carat scale 91 for diamonds and other precious stones, so that if a stone is measured as indicated in Fig. 4 its weight is indicated by reference to said scales 90 and 91.

To use the invention and if it is desired to measure a finger for a ring the gage is located on the finger as shown in Fig. 1, the handle 61 having been pulled down, and the jaw 48 with its edge 50 brought to bear against one side of the finger, while the edge 33 of the jaw 32 bears against the other side of the finger. The jaw 48 by moving to different positions turns the pinion 74 and thereby the pivot 72. The pivot 72 turning turns the gear 73 and thereby the pointer bar 67 with its pointer 69. The latter indicates the size of the ring on the scale 30. With the turning of the pivot 72 the pinion 74 is turned, and the latter moves the pointer bar 45 and thereby the pointer 47 in proper location on the scale 31 to measure any object between the measuring edges 35 and 52.

Having described my invention what I desire to secure by Letters Patent and claim is:

1. In a gage of the character described the combination of a plate having a pair of scales formed thereon and a stationary jaw formed therewith, a movable jaw coacting with the stationary jaw, a pointer bar extending from the movable jaw, a pointer on said bar coacting with one of said scales, a rack formed with said bar, a pivot pivoted in said plate, a pinion fastened to said pivot and meshing with said rack, a gear on said pivot, a reciprocating pointer bar in the gage, a rack formed with the latter meshing with said gear and a pointer extending from the second bar for the other scale.

2. In a gage of the character described the combination of a plate having a pair of scales formed thereon and a stationary jaw formed therewith, the said stationary jaw having a finger gaging edge and a ring gaging edge, a movable jaw coacting with the stationary jaw and having a finger gaging edge and a ring gaging edge, a pointer bar extending from the movable jaw for one of said scales, a second pointer bar in the gage for the other scale, gearing interposed between the two pointer bars to move simultaneously with the movements of the movable jaw and means to lock the movable jaw in operative position.

3. In a gage of the character described the combination of a top plate with a pair of scales formed thereon and a rear plate, a second and third plate, each with a slot, interposed between said top and rear plates, all of said plates registering with each other, a stationary jaw extending from one end of each of said plates, means to clamp said plates together, a pointer bar having a rack movably located in the slot formed in the second plate coacting with one of the scales on the top plate, a jaw extending from said bar, a pointer bar having a rack located in the slot in the third plate coacting with the second scale on the top plate, a pivot extending through the gage, a pinion and a gear fastened to said pivot, the pinion meshing with the rack of the pointer bar having the movable jaw and the gear meshing with the rack of the other pointer bar, a screw supported in the movable jaw, a handle on the screw located over the top plate and a washer interposed between said handle and the said top plate to lock the movable jaw in position.

4. In a gage of the character described the combination of a top plate with a pair of scales formed thereon and a stationary jaw formed therewith, the latter having a gaging edge, a movable jaw coacting with the stationary jaw and having a gaging edge, a pointer bar extending from the movable jaw for one of said scales, a second pointer bar in the gage for the other scale, gearing interposed between the two pointer bars to move them simultaneously with the movements of the movable jaw and means to lock the movable jaw in operative position.

5. In a gage of the character described the combination of a stationary jaw having a curved inner gaging edge and an outer gaging edge, a line perpendicular to the longitudinal axis of the gage tangent to the curved inner gaging edge being coincident with said outer gaging edge, the said gaging edges being correlative to each other, and a movable jaw coacting with the stationary jaw and having a curved inner gaging edge and an outer gaging edge, a line perpendicular to the longitudinal axis of the gage and tangent to the curved gaging edge of the movable jaw being coincident to the outer gaging edge of the movable jaw, the latter two gaging edges being correlative to each other.

6. In a gage of the character described the combination of a stationary jaw having a curved inner gaging edge and an outer gaging edge, a movable jaw in the gage having a rack formed therewith and a spur gear meshing with the rack to control the movements of the movable jaw, the said curved inner gaging edges being correlative to the outer gaging edges.

Signed at the borough of Manhattan in the county of New York and State of New York this 30th day of March A. D. 1912.

MONROE ENGELSMAN.

Witnesses:
A. A. DE BONNEVILLE,
GEORGE G. POWELL.

Copies of this patent may be obtained for five cents each, by addressing the "Commissioner of Patents, Washington, D. C."